No. 772,334. PATENTED OCT. 18, 1904.
J. J. BORNHEIMER.
CALIPERS.
APPLICATION FILED FEB. 5, 1904.
NO MODEL.
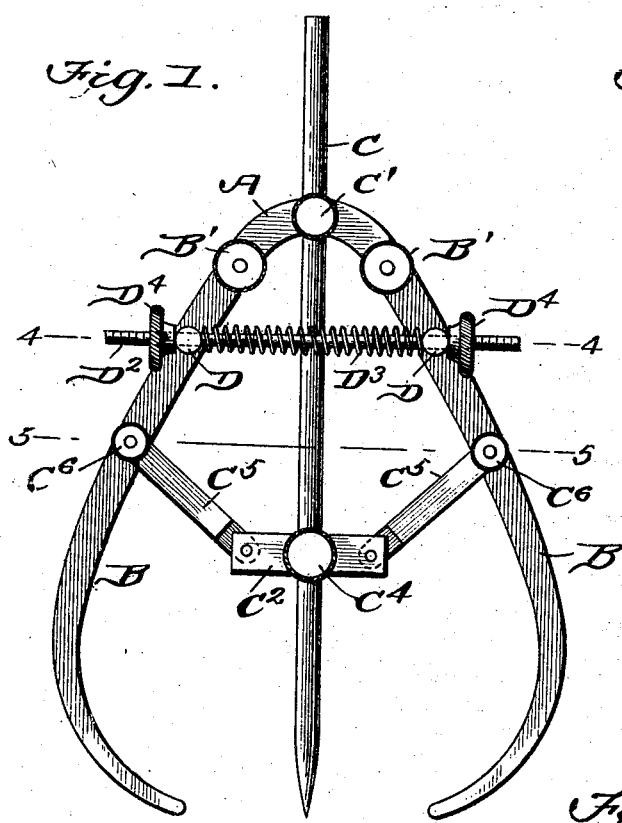
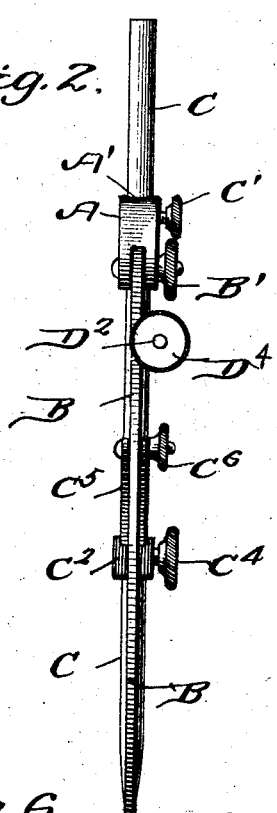
Witnesses
Inventor
J. J. Bornheimer.

No. 772,334.

Patented October 18, 1904.

UNITED STATES PATENT OFFICE.

JOHN J. BORNHEIMER, OF NEW BRUNSWICK, NEW JERSEY.

CALIPERS.

SPECIFICATION forming part of Letters Patent No. 772,334, dated October 18, 1904.

Application filed February 5, 1904. Serial No. 192,181. (No model.)

*To all whom it may concern:*

Be it known that I, JOHN J. BORNHEIMER, a citizen of the United States, residing at New Brunswick, in the county of Middlesex and State of New Jersey, have invented a new and useful Improvement in Calipers, of which the following is a specification.

My invention relates to a measuring and drafting device, and especially to the means for combining the various parts together and the manner in which the device is adjusted.

My invention consists in the novel features of construction and combination of parts hereinafter described, particularly pointed out in the claims, and shown in the accompanying drawings, in which—

Figure 1 is a side elevation of my improved device. Fig. 2 is a vertical edge view of the device. Fig. 3 is a top plan view of the device. Fig. 4 is a transverse section on the line 4 4 of Fig. 1. Fig. 5 is a section on the line 5 5 of Fig. 1. Fig. 6 is a detail sectional view of the crown-piece. Fig. 7 is a detail sectional view of a supporting-bar.

In the drawings, A represents a crown-piece slightly curved, bifurcated at each end, and having a vertical bore A' midway the ends. In the bifurcated portion of each end of the crown-piece fits the upper end of a caliper-leg B, pivotally connected to the crown-piece A and held by knurled nuts B'. Through the bore A' extends a rod C, pointed at the lower end and held in its adjusted position by the knurled nut C', the rod C being vertically adjustable by loosening the nut. A supporting bar or block $C^2$ has a transversely-arranged vertical bore $C^3$ therein and is arranged on the rod C below the crown-piece A. The bar $C^2$ is slidable on the rod C and is clamped in the desired position by the nut $C^4$. The ends of the bar are bifurcated, and in these bifurcated portions are pivoted the inner reduced end portions of the link $C^5$, the outer ends of the links being bifurcated and fit over and are secured to the caliper-legs B by the knurled nuts and screws $C^6$, similar in construction to the knurled nuts previously mentioned. It is obvious that by loosening the nut C' and adjusting the rod C to a higher or lower position the distance between the caliper-points would be changed and that the said caliper legs and points will be held by the bar $C^2$ and links $C^5$ in the position to which they may be adjusted, also that by loosening the nut $C^4$ and sliding the bar $C^2$ on the rod C similar adjustment of the calipers is possible. It will be further noted, however, that on the caliper-legs, intermediate the upper ends of the calipers and the nuts $C^6$, are arranged rotatable sleeves D, held in place by the pins D', or the pins and sleeves may be integral, the pins being passed through the caliper-legs and headed and having a rotatory movement in their bearings. A threaded rod $D^2$ is held horizontally in the sleeves, extending entirely through the sleeves, and around the rod between the sleeves is arranged a coiled spring $D^3$, bearing at its ends upon the sleeves and tending to force the calipers apart. Milled nuts are fitted on the end portions of the rod $D^2$, as at $D^4$, and by screwing them on the rod against the sleeves the latter will be forced inward against the tension of the spring $D^3$. It is obvious that the nuts $D^4$ will lock the calipers B in their adjusted position. By loosening the knurled nuts C' and $C^4$ the rod C may be adjusted without disturbing the adjustment of the calipers. It is further obvious that when the knurled nut C' or the nut $C^4$ is loosened and the nuts $D^4$ are adjusted the point of the rod C will be accurately and automatically centered between the points of the calipers through the medium of the links $C^5$.

It will be noted that by securing the various parts together by the knurled nuts instead of by ordinary pivot-pins the various parts can be quickly detached—as, for example, the crown-piece and rod C may alone be used as a measuring-gage. The calipers can also be used without the rod C and the bar $C^2$ and links $C^5$. When the parts are assembled, as shown in Fig. 1, a very handy instrument is provided for not only measuring the width of beads, molding, &c., but also the thickness of boards, window-sashes, and door-frames, and while the caliper-points will indicate the width or thickness the pointed rod C will mark the exact center of the part measured. Other advantages of my construction will be obvious to those skilled in the use of these instruments.

Having thus fully described my invention, what I claim, and desire to secure by Letters Patent, is—

1. A device of the kind described comprising a crown-piece, caliper-legs pivotally secured to the crown-piece, a threaded bar carried transversely by the calipers, nuts adapted to work on said bar and force the caliper-legs inward, a vertically-adjustable rod suspended from the crown-piece between the caliper-legs, and links pivotally connected to the caliper-legs and adapted to center and support the said rod.

2. A device of the kind described comprising a crown-piece having a vertical bore intermediate its ends, and bifurcated at the ends, caliper-legs pivoted in the bifurcated portions of the crown-piece, sleeves carried by the caliper-legs, a threaded rod carried by the said sleeves transversely to the caliper-legs, nuts adapted to work on the outer portions of the rod and bear on the sleeves, a spring arranged between the sleeves and bearing on them and adapted to force the caliper-legs apart, a rod extending through the vertical bore of the crown-piece, and means for centering the rod between the lower ends of the caliper-legs.

3. A device of the kind described comprising a crown-piece slightly curved and bifurcated at the ends, caliper-legs detachably and pivotally held in said bifurcated portions, sleeves rotatably secured to the caliper-legs, a rod passing loosely through the said sleeves and threaded adjacent each end, a coiled spring encircling the central portion of the rod and bearing on the sleeves, and adjustable nuts adapted to work on the threaded portions of the rod and bear on the outer sides of the sleeves.

4. A device of the kind described comprising a crown-piece, a vertical rod adjustably held by the crown-piece, caliper-legs pivoted to the crown-piece, a horizontally-arranged bar adapted to slide on the rod below the crown-piece, a nut adapted to clamp said bar to the rod, links each pivotally connected at one end to an end of the bar and at the opposite end removably pivoted to one of the caliper-legs, and a knurled nut adapted to clamp the rod to the crown-piece.

JOHN J. BORNHEIMER.

Witnesses:
 JOHN J. ZIMMERMAN,
 WALTER J. LAUGHTON.